United States Patent
Neal et al.

(10) Patent No.: US 7,809,581 B1
(45) Date of Patent: Oct. 5, 2010

(54) RULE RELAXATION AND SUBSET OPTIMIZATION SYSTEM

(75) Inventors: Michael Neal, San Francisco, CA (US); Krishna Venkatraman, Menlo Park, CA (US); Rob Parkin, San Francisco, CA (US); Suzanne Valentine, Atlanta, GA (US); Phil Delurgio, Dana Point, CA (US); Hau Lee, Los Altos, CA (US)

(73) Assignee: DemandTec, inc., San Mateo, CA (US)

( * ) Notice: Subject to any disclaimer, the term of this patent is extended or adjusted under 35 U.S.C. 154(b) by 755 days.

(21) Appl. No.: 10/007,002

(22) Filed: Nov. 30, 2001

(51) Int. Cl.
   *G06Q 10/00* (2006.01)
(52) U.S. Cl. .................................. 705/1.1; 705/400
(58) Field of Classification Search .............. 705/1, 705/7, 10, 400
   See application file for complete search history.

(56) References Cited

U.S. PATENT DOCUMENTS

| | | | |
|---|---|---|---|
| 3,017,610 A | 1/1962 | Auerbach et al. | |
| 4,744,026 A | 5/1988 | Vanderbei | |
| 4,862,357 A | 8/1989 | Ahlstrom et al. | |
| 4,907,170 A | 3/1990 | Bhattacharya | |
| 4,916,443 A | 4/1990 | Barrett et al. | |
| 5,063,506 A | 11/1991 | Brockwell et al. | 364/402 |
| 5,117,354 A | 5/1992 | Long et al. | 364/401 |
| 5,189,606 A | 2/1993 | Burns et al. | |
| 5,212,791 A | 5/1993 | Damian et al. | |
| 5,249,120 A | 9/1993 | Foley | 364/401 |
| 5,299,115 A | 3/1994 | Fields et al. | 364/401 |
| 5,377,095 A | 12/1994 | Maeda et al. | 364/401 |
| 5,459,656 A | 10/1995 | Fields et al. | 364/401 |
| 5,521,813 A | 5/1996 | Fox et al. | |
| 5,615,109 A | 3/1997 | Eder | |
| 5,694,551 A | 12/1997 | Doyle et al. | |
| 5,712,985 A | 1/1998 | Lee et al. | 395/207 |
| 5,732,401 A | 3/1998 | Conway | 705/29 |
| 5,765,143 A | 6/1998 | Sheldon et al. | |
| 5,774,868 A | 6/1998 | Cragun et al. | |
| 5,790,643 A | 8/1998 | Gordon et al. | |

(Continued)

FOREIGN PATENT DOCUMENTS

WO   WO 97/46950   12/1997

(Continued)

OTHER PUBLICATIONS

Yeoman: "The Optimal Offering Price for Underwritten Seurities"; 1993, vol. 55/01-A of the Dissertation Abstracts international, p. 4743, (Abstract Only).*

(Continued)

*Primary Examiner*—Dennis Ruhl
(74) *Attorney, Agent, or Firm*—Kang Lim

(57) ABSTRACT

A method for computing a preferred set of prices for products in a subset of a plurality of products is provided. Generally, initial prices for a plurality of products are stored. A subset of products of the plurality of products is designated, where the number of products in the subset of products is less than the number of products in the plurality of products. Prices for the products in the subset of products are optimized, while maintaining the initial prices of products of the plurality of products that are not in the subset of products.

17 Claims, 10 Drawing Sheets

U.S. PATENT DOCUMENTS

| | | | |
|---|---|---|---|
| 5,799,286 A | 8/1998 | Morgan et al. | 705/30 |
| 5,822,736 A | 10/1998 | Hartman et al. | 705/1 |
| 5,832,456 A | 11/1998 | Fox et al. | |
| 5,832,458 A | 11/1998 | Jones | |
| 5,873,069 A | 2/1999 | Reuhl et al. | 705/20 |
| 5,878,400 A | 3/1999 | Carter, III | 705/20 |
| 5,902,351 A | 5/1999 | Streit et al. | |
| 5,918,209 A | 6/1999 | Campbell et al. | 705/5 |
| 5,933,813 A | 8/1999 | Teicher et al. | |
| 5,987,425 A | 11/1999 | Hartman et al. | 705/20 |
| 6,009,407 A | 12/1999 | Garg | 705/10 |
| 6,009,415 A | 12/1999 | Shurling et al. | |
| 6,029,139 A | 2/2000 | Cunningham et al. | 705/10 |
| 6,032,123 A | 2/2000 | Jameson | 705/8 |
| 6,032,125 A | 2/2000 | Ando | 705/10 |
| 6,044,357 A | 3/2000 | Garg | |
| 6,052,686 A * | 4/2000 | Fernandez et al. | 707/100 |
| 6,078,893 A | 6/2000 | Ouimet et al. | 705/10 |
| 6,094,641 A | 7/2000 | Ouimet et al. | 705/10 |
| 6,125,355 A | 9/2000 | Bekaert et al. | 705/36 |
| 6,134,534 A | 10/2000 | Walker et al. | |
| 6,173,345 B1 * | 1/2001 | Stevens | 710/100 |
| 6,202,070 B1 | 3/2001 | Nguyen et al. | |
| 6,205,431 B1 | 3/2001 | Willemain et al. | 705/10 |
| 6,219,649 B1 | 4/2001 | Jameson | |
| 6,308,162 B1 | 10/2001 | Ouimet et al. | 364/401 |
| 6,321,207 B1 | 11/2001 | Ye | |
| 6,341,268 B2 | 1/2002 | Walker et al. | |
| 6,341,269 B1 | 1/2002 | Dulaney et al. | |
| 6,397,193 B1 | 5/2002 | Walker et al. | |
| 6,405,175 B1 | 6/2002 | Ng | |
| 6,430,539 B1 | 8/2002 | Lazarus et al. | |
| 6,456,986 B1 | 9/2002 | Boardman et al. | |
| 6,536,935 B2 | 3/2003 | Parunak et al. | |
| 6,546,387 B1 | 4/2003 | Triggs | |
| 6,553,352 B2 | 4/2003 | Delurgio et al. | |
| 6,567,824 B2 | 5/2003 | Fox | |
| 6,609,101 B1 | 8/2003 | Landvater et al. | |
| 6,684,193 B1 | 1/2004 | Chavez et al. | |
| 6,697,824 B1 | 2/2004 | Bowman-Amuah | |
| 6,725,208 B1 | 4/2004 | Hartman et al. | |
| 6,731,998 B2 | 5/2004 | Walser et al. | |
| 6,735,572 B2 | 5/2004 | Landesmann | |
| 6,745,184 B1 | 6/2004 | Choi et al. | |
| 6,826,538 B1 | 11/2004 | Kalyan et al. | |
| 6,910,017 B1 | 6/2005 | Woo et al. | |
| 6,934,931 B2 | 8/2005 | Plumer et al. | |
| 6,965,867 B1 | 11/2005 | Jameson | |
| 6,988,076 B2 | 1/2006 | Ouimet | |
| 7,058,617 B1 | 6/2006 | Hartman et al. | |
| 7,062,447 B1 | 6/2006 | Valentine et al. | |
| 7,072,848 B2 | 7/2006 | Boyd et al. | |
| 7,092,896 B2 | 8/2006 | Delurgio et al. | |
| 7,092,918 B1 | 8/2006 | Delurgio et al. | |
| 7,092,929 B1 | 8/2006 | Dvorak et al. | |
| 7,130,811 B1 | 10/2006 | Delurgio et al. | |
| 7,155,402 B1 | 12/2006 | Dvorak | |
| 7,240,019 B2 | 7/2007 | Delurgio et al. | |
| 7,249,031 B2 | 7/2007 | Close et al. | |
| 7,249,032 B1 | 7/2007 | Close et al. | |
| 7,249,033 B1 | 7/2007 | Close et al. | |
| 7,302,410 B1 | 11/2007 | Venkatraman et al. | |
| 2001/0014868 A1 | 8/2001 | Herz et al. | |
| 2002/0023001 A1 | 2/2002 | McFarlin et al. | |
| 2002/0042739 A1 | 4/2002 | Srinivasan et al. | |
| 2002/0042755 A1 | 4/2002 | Kumar et al. | |
| 2002/0107819 A1 | 8/2002 | Ouimet | |
| 2002/0116348 A1 | 8/2002 | Phillips et al. | |
| 2002/0123930 A1 | 9/2002 | Boyd et al. | |
| 2002/0169657 A1 | 11/2002 | Singh et al. | |
| 2002/0198794 A1 | 12/2002 | Williams et al. | |
| 2003/0028437 A1 | 2/2003 | Grant et al. | |
| 2003/0110072 A1 | 6/2003 | Delurgio et al. | |
| 2003/0177103 A1 | 9/2003 | Ivanov et al. | |
| 2003/0200185 A1 | 10/2003 | Huerta et al. | |
| 2003/0220830 A1 | 11/2003 | Myr | |
| 2004/0111358 A1 | 6/2004 | Lange et al. | |
| 2004/0210541 A1 | 10/2004 | Epstien et al. | |
| 2004/0243432 A1 | 12/2004 | Kelly et al. | |
| 2005/0096963 A1 | 5/2005 | Myr et al. | |
| 2005/0108070 A1 | 5/2005 | Kelly et al. | |
| 2006/0161504 A1 | 7/2006 | Walser et al. | |
| 2006/0224534 A1 | 10/2006 | Hartman et al. | |

FOREIGN PATENT DOCUMENTS

| | | |
|---|---|---|
| WO | WO 98/53415 | 11/1998 |
| WO | WO 00/70519 | 11/2000 |
| WO | WO 00/70556 | 11/2000 |

OTHER PUBLICATIONS

"Report of Novelty Search" by Patentec, dated Feb. 9, 2001.

"Report of Novelty Search" by Patentec, dated Jul. 25, 2001.

Stephen J. Hoch et al., "Store Brands and Category Management", The Wharton School, University of Pennsylvania, Mar. 1998, pp. 1-38.

Bruce G.S. Hardie et al., "Attribute-based Market Share Models: Methodological Development and Managerial Applications", University of Pennsylvania, Working Paper 98-009, pp. 1-48.

Alan Mercer, "Non-linear Price Effects", Journal of the Market Research Society, dated Jul. 1, 1996, p. 227.

Rockney G. Walters, "Assessing the Impact of Retail Price Promotions on Product Substitution, Complementary Purchase, and Interstore Sales Displacement", Journal of Marketing, vol. 55, Apr. 1991, pp. 17-28.

Robert C. Blattberg et al., "How Promotions Work", Marketing Science, vol. 14, No. 3, Part 2 of 2, 1995, pp. G122-G132.

Peter M. Guadagni et al., "A Logit Model of Brand Choice Calibrated on Scanner Data", Marketing Science, vol. 2, No. 3, Summer 1983, pp. 203-238.

Lee G. Cooper et al., "Standardizing Variables in Multiplicative Choice Models", Journal of Consumer Research, vol. 10, Jun. 1983, pp. 96-108.

Eileen Bridges et al., "A High-Tech Product Market Share Model With Customer Expectations" Marketing Science, vol. 14, No. 1, Winter 1995, pp. 61-81.

Richard R. Batsell, et al., "A New Class of Market Share Models", Marketing Science, vol. 4, No. 3, Summer 1985, pp. 177-198.

Jagmohan S. Raju, "The Effect of Price Promotions on Variability in Product Category Sales", Marketing Science, vol. 11, No. 3, Summer 1992, pp. 207-220.

Robert J. Dolan, "How Do You Know When the Price is Right?", Harvard Business Review, Sep.-Oct. 1995, pp. 5,7,9,11.

Fusun Gonul, "Modeling Multiple Sources of Heterogeneity in Multinomial Logit Models: Methodological and Managerial Issues", Marketing Science, vol. 12, No. 3, Summer 1993, pp. 213-229.

Robert M. Schindler et al., "Increased Consumer Sales Response through Use of 99-Ending Prices", Journal of Retailing, Jun. 1, 1996, p. 187.

Francis J. Mulhern et al., "The Relationship between Retail Price Promotions and Regular Price Purchases", Journal of Marketing, vol. 59, Oct. 1995, pp. 83-90.

John Deighton et al., "The Effects of Advertising on Brand Switching and Repeat Purchasing", Journal of Marketing Research, vol. XXXI, Feb. 1994, pp. 28-43.

Sunil Gupta, "Reflections on 'Impact of Sales Promotions on When, What, and How Much to Buy'", Journal of Marketing Research, vol. XXX, Nov. 1993, pp. 522-524.

Richard A. Briesch, "Does it Matter How price Promotions Are Operationalized?", Marketing Letters 8:2 (1997), pp. 167-181.

Byung-Do Kim et al., "Modeling the Distribution of Price Sensitivity and Implications for Optimal Retail Pricing", Journal of Business & Economic Statistics, Jul. 1995, vol. 13, No. 3.

William R. Dillon et al., "A Segment-level Model of Category Volume and Brand Choice", Marketing Science, vol. 15, No. 1, 1996, pp. 38-59.

Stephen J. Hoch at al., "Determinants of Store-Level Price Elasticity", Journal of Marketing Research, vol. XXXII (Feb. 1995), pp. 17-29.

Magid M. Abraham et al., "An Implemented System for Improving Promotion Productivity Using Store Scanner Data", Marketing Science, vol. 12, No. 3, Summer 1993.

Peter S. Fader et al., "Modeling Consumer Choice among SKUs", Journal of marketing Research, vol. XXXII (Nov. 1996), pp. 442-452.

Rossi, Delorgio, & Kantor; "Making Sense of Scanner Data;" Harvard Business Review, Reprint F00205.

Bucklin & Gupta, "Brand Choice, Purchase Incidence, and Segmentation: An Integrated Modeling Approach," Journal of Marketing Research, May 1992, pp. 201-215, vol. XXIX.

Smith, Mathur, & Kohn; Bayesian Semiparametric Regression: An Exposition and Application to Print Advertising;: Jan. 3, 1997; Australian Graduate School of Management, University of New South Wales, Sydnet 2025, Australia.

Blattberg and Deighton, "Manage Marketing by the Customer Equity," Harvard Business Review, Jul.-Aug. 1996, pp. 136-144.

Christen, Gupta, Porter, Staelin & Wittink; "Using Market-Level Data to Understand the Effectiveness of Promotional Activities;" Dec. 22, 1995.

Ross Link, "Are Aggregate Scanner Data Models Biased?," Journal of Advertising Research, Sep./Oct. 1995, pp. RC8-RC12, ARF.

Russell et al., "Understanding Brand Completion Using Micro and Macro Scanner Data," Journal of Marketing Research, vol. XXXI (May 1994), pp. 289-303.

John Philip Jones, "The Double Jeopardy of Sales Promotions," Harvard Business Review, Sep.-Oct. 1999, pp. 145-152.

Buzzell, Quelch, & Salmon; "The Costly Bargain of Trade Promotion;" Harvard Business Review, Reprint 90201, Mar.-Apr. 1990, pp. 1-9.

Curry, Divakar, Mathur & Whiteman; "Bvar as a Category Management Tool: An Illustration and Comparison with Alternative Techniques;" Journal of Forecasting, vol. 14, Iss. No. 3 (1995), pp. 181-199.

Montgomery: "The Impact of Micro-Marketing on Pricing Strategies", 1994 The University of Chicago vol. 55/12-A of Dissertation of Abstracts International, p. 3922 (Abstract Only).

Busch: "Cost Modeling as a Technical Management Tool", Research-Technology Management, Nov./Dec. 1994, vol. 37, No. 6, pp. 50-56.

"Pacificorp IRP: Renewables Costs Must Drop 65% to be Competitive with Gas".

"PCT International Search Report", Application No. PCT/US02/14977, mailed May 5, 2003.

Dyer, Robert F. et al., "Case Studies in Marketing Decisions Using Expert Choice," Decision Support Software, 1988, pp. 2-7, 73-108.

"PCT International Search Report", Application No. PCT/US03/30488, mailed Jan. 28, 2004.

Robert J. Dolan, "How Do You Know When the Price is Right?", Harvard Business Review, Sep.-Oct. 1995, p. 4-11.

Alan L. Montgomery and Peter R. Rossi, "Estimating Price Elasticities with Theory-Based Priors," Journal of Marketing Research vol. XXXVI, Nov. 1999 (pp. 413-423).

Boatwright, Peter et al., "Account-Level Modeling for Trade Promotion: An Application of a Constrained Parameter Hierarchical Model," Journal of the American Statistical Association, vol. 94, No. 448, Dec. 1999 (pp. 1063-1073).

Alan L. Montgomery, "Creating Micro-Marketing Pricing Strategies Using Supermarket Scanner Data," Marketing Science, vol. 16, No. 4, 1997 (pp. 315-337).

Robert C. Blattberg and Edward I. George, "Shrinkage Estimation of Price and Promotional Elasticities: Seemingly Unrelated Equations," Journal of the American Statistical Association, vol. 86, No. 414, Jun. 1991 (pp. 304-315).

Arnold Zellner, "On Assessing Prior Distribution sand Bayesian Regression Analysis With G-Prior Distributions," Elsevier Science Publishers, 1986 (pp. 233-243).

D.V. Lindley and A.F.M. Smith, "Bayes Estimates for the Linear Model," University College, Dec. 1971.

George C. Tiao and Arnold Zellner, "On the Bayesian Estimation of Multivariate Regression," University of Wisconsin, Jan. 1964.

Arnold Zellner, "An Efficient Method of Estimating Seemingly Unrelated Regressions and Tests for Aggregation Bias," University of Wisconsin, Jun. 1962.

A.F.M. Smith, "A General Bayesian Linear Model," University of Oxford, Apr. 1972.

"Merriam Webster's Collegiate Dictionary", 10th edition, p. 585, Merriam-Webster Incorporated, 1999.

Hernandez, Mauricio A., and Salvatore J. Stolfo, "Real-world Data is Dirty: Data Cleansing and the Merge/Purge Problem", Data Mining and Knowledge Discovery, vol. 2, Issue 1; Jan. 1998.

Scherage, Dan, "You Do the Math," Chain Store Age, v76, n7, Jul. 2000.

"Gymboree Enhances Price Management," Retail Systems Alert, vol. 13, No. 6, Jun. 2000.

Binkley, James K.; Connor, John M., "Grocery Market Pricing and the New Competitive Envirornment." Journal of Retailing, v74, n2, Summer 1998.

"KhiMetrics Helps Retailers Increase Margins With Two New Tools for Their Retail Revenue Management Application Suite." PR Newswire, Mar. 1, 2001.

"KhiMetrics and Retek Form Marketing Alliance for Comprehensive Retail Pricing Solution." PR Newswire, Feb. 19, 2001.

Barth, Brad. "ShopKo Holds the Price Line." Daily News Record, p. 10, Oct. 4, 2000.

Barth, Brad, "Shopko Tests Automated Markdowns", WWD Oct. 4, 2000, pp. 1-3.

"Manugistics Agrees to Acquire Talus Solutions." PR Newswire, Sep. 21, 2000.

"Goodyear Implements Trilogy's MultiChannel Pricing Solution as Its Enterprise-Wide E-Pricer Platform." Business Wire, p. 2286, Jun. 27, 2000.

"IMRglobal Signs New Product Implementation Agreement with Retek to Improve Retail Pricing and Markdown Process." Business Wire, p. 1590, Jun. 7, 2000.

Cook, Martie, "Optimizing Space and Sales with Markdown Software", Office.com, May 31, 2000, p. 1.

"New Tools for Modeling Elasticity, Optimizing Prices and Collecting Live Pricing from the Web to Debut at Retail Systems 2000 in Chicago." Business Wire, p. 1484, Apr. 18, 2000.

"Essentus and Spotlight Solutions Partnership Delivers Precise Markdown Decisions", Business Wire, Apr. 17, 2000, 3 pages.

Melcer, Rachel, "Local Tech Firm Creates Retail Markdown Tool", Business Courier online, Mar. 24, 2000, pp. 1-4.

Technology Strategy Incorporated, www.grossprofit.com, Mar. 2, 2000, pp. 1-20.

Kadiyali et al., "Manufacturer-retailer Channel Interactions and Implications for Channel rower: An Investigation of Pricing in Local Market", Marketing Science, Spring 2000, V. 19, Issue 2.

Andrew B. Gelman et al., "Bayesian Data Analysis", pp. 439-455, Chapman & Hall/CRC, First Edition 1995, Reprinted 2000.

Smith et al., "A Discrete Optimization Model for Seasonal Merchandise Planning." Journal of Retailing, vol. 74, No. 2, p. 193(29), Summer 1998.

Flanagan, David, "Javascript: The Definitive Guide, 3rd Edition," published by O'Reilly in Jun. 1998 (ISBN 1-56592-392-8) section 14:8.

Berners-Lee, T., "Hypertext Markup Language 2.0 Working Paper," Nov. 1995 (pp. 1-3).

Tellis, Gerard J., and Fred S. Zufryden, "Tackling the Retailer Decision Maze: Which Brands to Discount, How Much, When and Why," Marketing Science, vol. 1, No. 34, 1995 (pp. 271-299).

Abraham, Magid M. and Leonard M. Lodish, "Promoter: An Automated Promotion Evaluation System," Marketing Science, vol. 6, No. 2, 1987 (p. 101-123).

Little, John D. C., "Brandaid: A Marketing-Mix Model, Part 1: Structure," Operations Research, vol. 23, No. 4, Jul.-Aug. 1975 (p. 628-655).

Cerf, Vinton G. and Robert E. Kahn, "A Protocol for Packet Network Interconnection," IEEE Transactions on Communications COM-22, May 1974, (p. 637-648).

Hillier, Frederick S., et al., "Introduction to Operations Research", McGraw-Hill, Inc., 1995, Sixth Edition, pp. 1-14.

Diebold, Francis X. "The Past, Present, and Future of Macroeconomic Forecasting." Journal of Economic Perspectives (IJEP), vol. 12, No. 2, pp. 175-192, Spring 1998.

Mulhern et al. "Measuring Market Response to Price Changes: A Classification Approach". J Busn Res 1 :33.197-205.

"Supplementary European Search Report", Application No. 02719197.2-2221 dated Feb. 2, 2007.

"PCT International Search Report and the Written Opinion of the International Searching Authority", Application No. PCT/US 07/20678, mailed Feb. 26, 2008.

* cited by examiner

RULE RELAXATION AND SUBSET OPTIMIZATION SYSTEM

CROSS-REFERENCE TO RELATED APPLICATIONS

This application relates to co-pending and concurrently filed application Ser. No. 09/999,078 filed Nov. 30, 2001, entitled "Selective Merchandise Price Optimization Mechanism", by Michael Neal, Krishna Venkatraman, Rob Parkin, Suzanne Valentine, Phil Delurgio, Hau Lee, and John Close, which is incorporated by reference herein for all purposes.

BACKGROUND OF THE INVENTION

The present invention relates to providing optimized pricing for a subset of a plurality of products for a plurality of stores.

In businesses, prices of various products must be set. Such prices may be set with the goal of maximizing profit or demand or for a variety of other objectives. Profit is the difference between total revenue and costs. Total sales revenue is a function of demand and price, where demand is a function of price. Demand may also depend on the day of the week, the time of the year, the price of related products, the location of a store, and various other factors. As a result, the function for forecasting demand may be very complex. Costs may be fixed or variable and may be dependent on demand. As a result, the function for forecasting costs may be very complex. For a chain of stores with tens of thousands of different products, forecasting costs and determining a function for forecasting demand are difficult. The enormous amounts of data that must be processed for such determinations are too cumbersome even when done by computer.

It is desirable to provide an efficient process and methodology for determining the prices of individual products such that profit (or whatever alternative objective) is optimized.

During optimization, it may be found that one of the plurality of rules is infeasible. Such a finding of infeasibility may stop the optimization process. It would be desirable to provide a method of handling optimization when a rule is found to be infeasible.

It is desirable to update prices as new information about the products and competitive environment is received. Examples of this type of information would include product cost updates, product addition or discontinuance, and new competitive price or base price data. Ideally, when a user receives new information, they would run a secondary optimization over a whole product category. This would allow the optimization to fully capture all of the complementary and substitution effects in selecting the new set of optimal prices. However, if the cost of changing prices is not negligible, optimization and changing prices of all products in a whole product category may not be desirable.

SUMMARY OF THE INVENTION

To achieve the foregoing and other objects and in accordance with the purpose of the present invention, a method for computing a preferred set of prices for a subset of a plurality of products is provided. Generally, initial prices for a plurality of products are stored. A subset of products of the plurality of products is designated, where the number of products in the subset of products is less than the number of products in the plurality of products. Prices for the subset of products are optimized, while maintaining the initial prices of products of the plurality of products that are not in the subset of products.

In another embodiment of the invention, an apparatus for computing a preferred set of prices for a subset of a plurality of products, comprising computer readable media, is provided. Generally, the computer readable media comprises computer readable code for storing initial prices for a plurality of products, computer readable code for designating a subset of products of the plurality of products, wherein the number of products in the subset of products is less than the number of products in the plurality of products, and computer readable code for optimizing prices for the subset of product, while maintaining the initial prices of products of the plurality of products that are not in the subset of products.

In another embodiment of the invention, a method for setting prices for a subset of products of a plurality of products is provided. Optimized prices for a product category are received. Every item in the product category is priced according to the received optimized prices. New data is then provided. New prices for the subset of products of the product category are then received, where the subset is smaller than the product category, and where the received new prices are generated by storing initial prices for a plurality of products, designating a subset of products of the plurality of products, and where the number of products in the subset of products is less than the number of products in the plurality of products, and optimizing prices for products in the subset of products, while freezing the initial prices of products of the plurality of products in the product category that are not in the subset of products. Prices for the subset of products are then set according to the received new prices.

In another embodiment of the invention, computer data signal embodied in a carrier wave and representing sequences of instructions which when executed by a processor, causes the processor to compute a preferred set of prices for a subset of a plurality of products is provided. Initial prices for a plurality of products are stored. A subset of products of the plurality of products is designated, where the number of products in the subset of products is less than the number of products in the plurality of products. Prices for products in the subset of products are optimized, while maintaining the initial prices of products of the plurality of products that are not in the subset of products.

In another embodiment of the invention a price database is provided. Initial prices for a plurality of products are stored. A subset of products of the plurality of products is designated, where the number of products in the subset of products is less than the number of products in the plurality of products. Prices for products in the subset of products are optimized, while maintaining the initial prices of products of the plurality of products that are not in the subset of products.

In another embodiment of the invention, a method for obtaining optimized price data on a client system is provided. Sales data is sent to a server system for a plurality of products. Optimization preferences are selected. The optimization preferences are sent to the server system. Optimization prices for all of the plurality of products are received from the server system. Additional sales data is sent to the server system. A subset constraint is selected. The subset constraint is sent to the server system. A new set of optimization prices for a subset of the plurality of products is received, where the number of products in the subset is less than the number of the plurality of products.

These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENTS

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Figure 1:
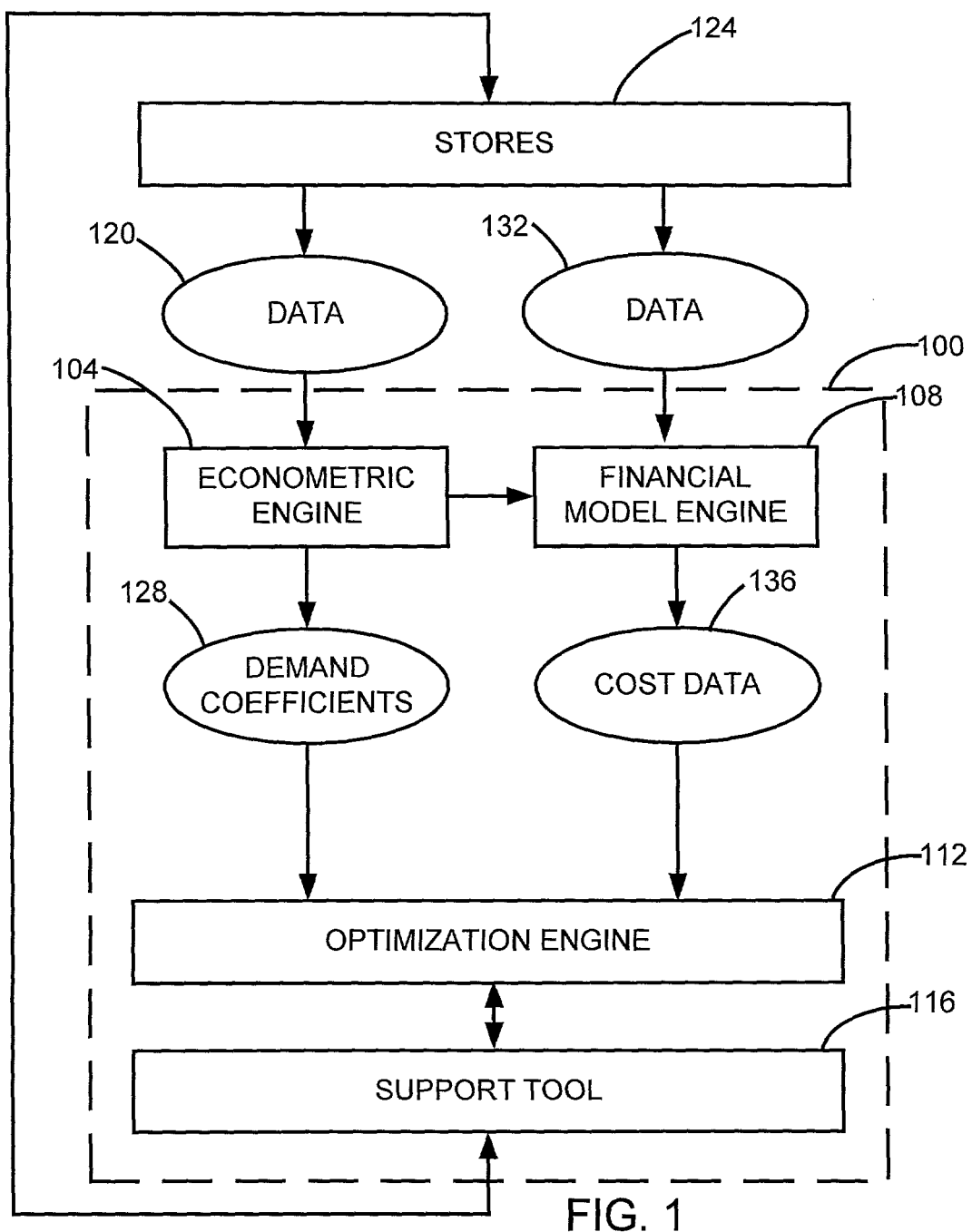
FIG. 1 is a high level schematic view of a price optimizing system.

To facilitate discussion, FIG. 1 is a schematic view of a price optimizing system 100, which may be used in rule relaxation and subset optimization. The price optimizing system 100 comprises an econometric engine 104, a financial model engine 108, an optimization engine 112, and a support tool 116. The econometric engine 104 is connected to the optimization engine 112, so that the output of the econometric engine 104 is an input of the optimization engine 112. The financial model engine 108 is connected to the optimization engine 112, so that the output of the financial model engine 108 is an input of the optimization engine 112. The optimization engine 112 is connected to the support tool 116 so that output of the optimization engine 112 is provided as input to the support tool 116 and output from the support tool 116 may be provided as input to the optimization engine 112. The econometric engine 104 may also exchange data with the financial model engine 108.

Figure 2:
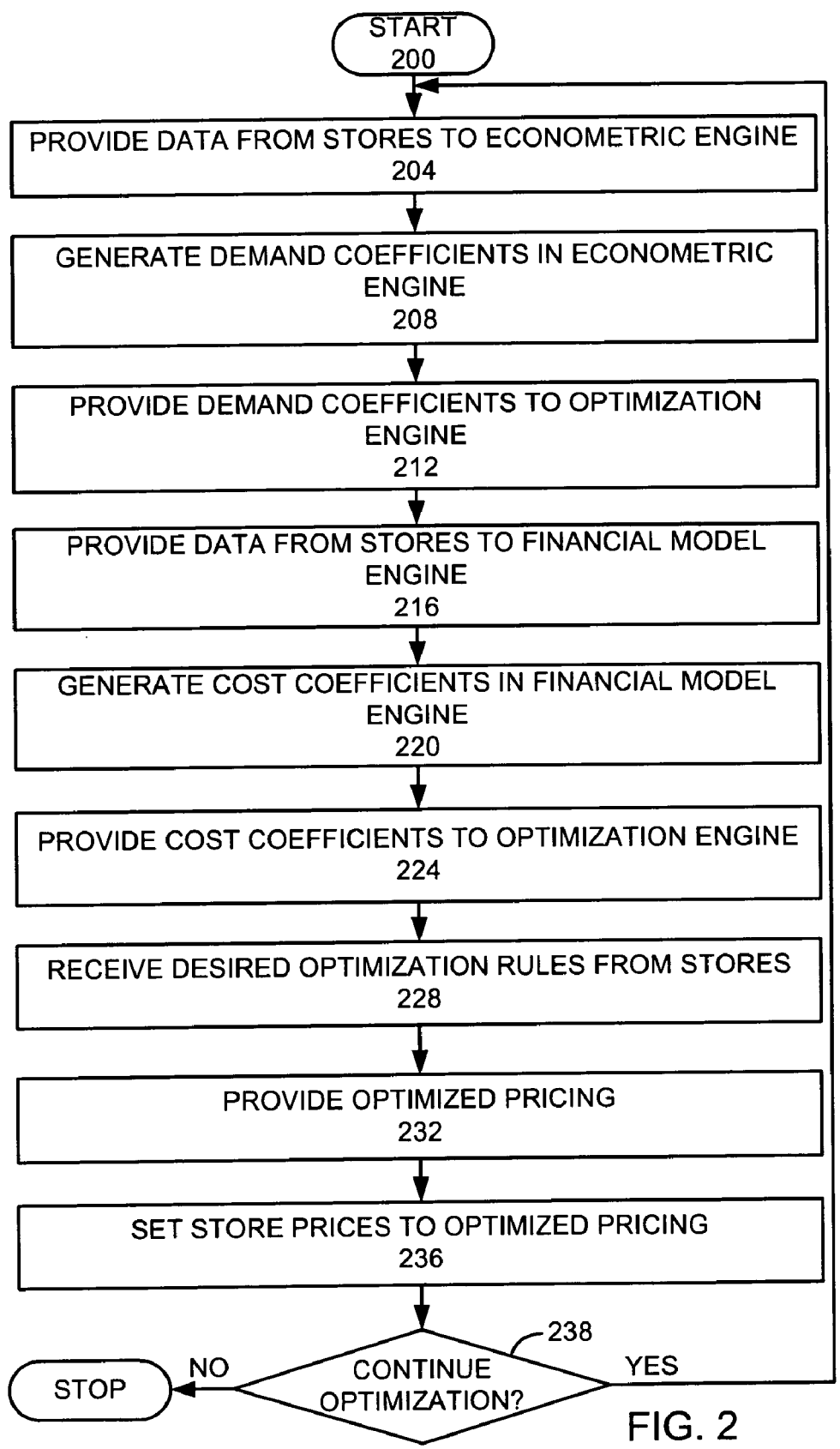
FIG. 2 is high level flow chart of a price optimization process.
Figure 7:
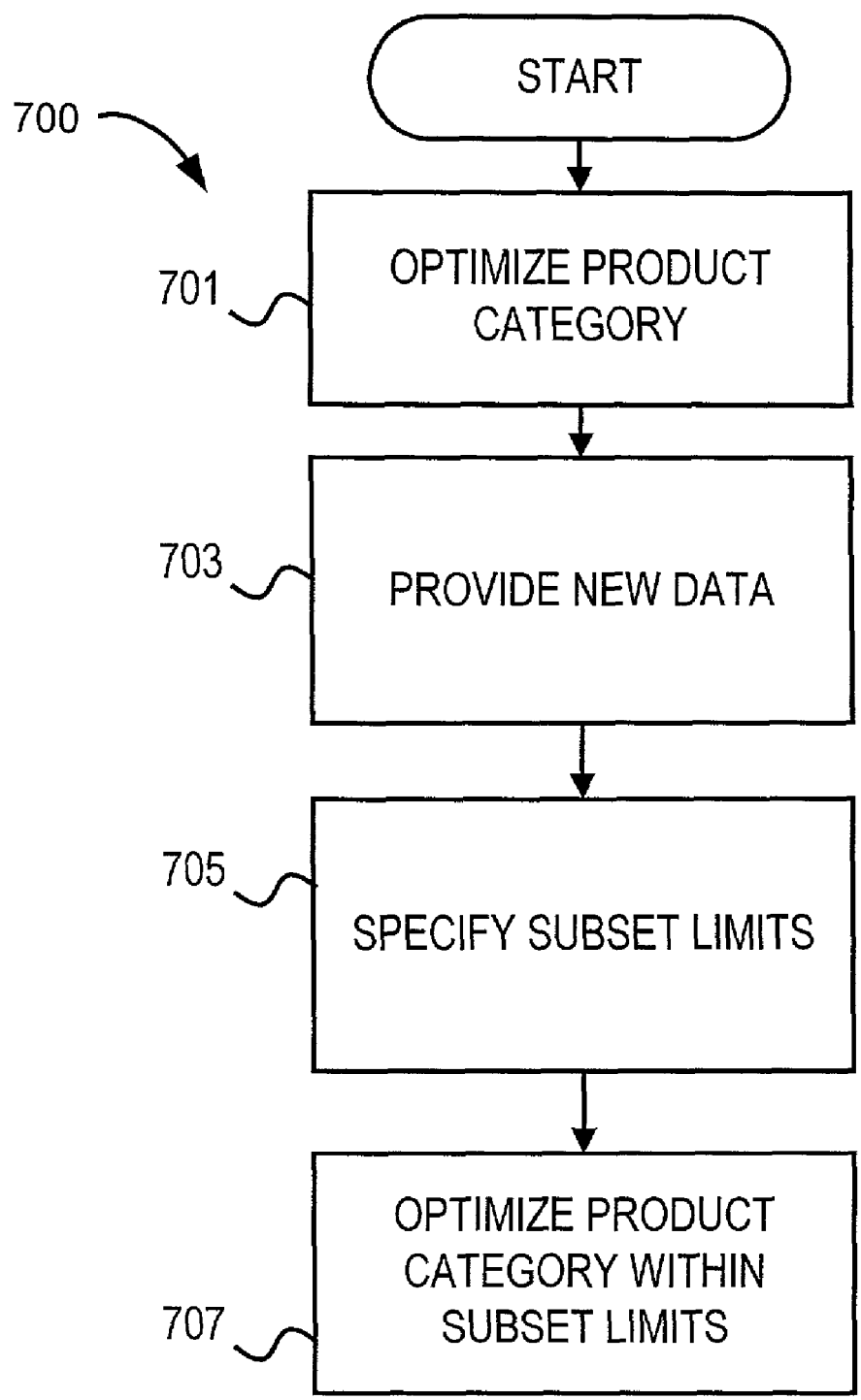
FIG. 7 is an overall flow chart of a process that uses subset optimization.

To facilitate understanding, FIG. 7 is an overall flow chart of a process that uses subset optimization 700. First, a product category is optimized (step 701). A demand group is defined as a set of products that are substitutes or near substitutes for each other. A product can belong to only one demand group. A product category consists of one or more demand groups. FIG. 2 is a more detailed flow chart of a preferred embodiment of a process that utilizes the price optimizing system 100 to optimize prices for a product category (step 701). The steps of FIG. 2 start at step 200 as shown. Data 120 is provided from the store computer systems 124 to the econometric engine 104 (step 204). Generally, the data 120 provided to the econometric engine 104 may be point-of-sale information, product information, and store information. The econometric engine 104 processes the data 120 to provide demand coefficients 128 (step 208) for a set of algebraic equations that may be used to estimate demand (volume sold) given certain marketing conditions (i.e. a particular store in the chain), including a price point. The demand coefficients 128 are provided to the optimization engine 112 (step 212). Additional processed data from the econometric engine 104 may also be provided to the optimization engine 112.

The financial model engine 108 may receive data 132 from the store computer systems 124 (step 216) and processed data from the econometric engine 104. The data 132 received from the stores is generally cost related data, such as average store labor rates, average distribution center labor rates, cost of capital, the average time it takes a cashier to scan an item (or unit) of product, how long it takes to stock a received unit of product and fixed cost data. The financial model engine 108 may process the data to provide a variable cost and fixed cost for each unit of product in a store. The processing by the econometric engine 104 and the processing by the financial model engine 108 may be done in parallel. Cost data 136 is provided from the financial model engine 108 to the optimization engine 112 (step 224).

The optimization engine 112 utilizes the demand coefficients 128 to create a demand equation. The optimization engine is able to forecast demand and cost for a set of prices and promotion conditions such as store displays and ads to calculate net profit. The stores 124 may use the support tool 116 to provide optimization rules to the optimization engine 112 (step 228). The optimization engine 112 may use the demand equation, the variable and fixed costs, and the rules to compute an optimal set of prices that meet the rules (step 232). For example, if a rule specifies the maximization of profit, the optimization engine would find a set of prices that cause the largest difference between the total sales revenue and the total cost of all products being measured.

If a rule providing a promotion of one of the products by specifying a discounted price is provided, the optimization engine may provide a set of prices that allow for the promotion of the one product and the maximization of profit under that condition. The rules normally include an objective, such as optimizing profit or optimizing volume of sales of a product and constraints such as a limit in the variation of prices When profit is maximized, it may be maximized for a sum of all measured products. Such a maximization, may not maximize profit for each individual product, but may instead have an ultimate objective of maximizing total profit.

The optimal (preferred) set of prices may be sent from the optimization engine 112 to the support tool 116 so that the stores 124 may use the user interface of the support tool 116 to obtain the optimal set of prices. Other methods may be used to provide the optimal set of prices to the stores 124. The price of the products in the stores 124 is set to the optimal set of prices (step 236), so that a maximization of profit or another objective is achieved. In step 238, it is ascertained whether optimization should be continued. If the decision in step 238 is to continue optimization, the process of FIG. 2 returns to step 204 to continue optimization. On the other hand, if the decision in step 238 is not to continue optimization, the process of FIG. 2 is done.

Each component of the price optimizing system 100 will be discussed separately in more detail below.

Figure 3:
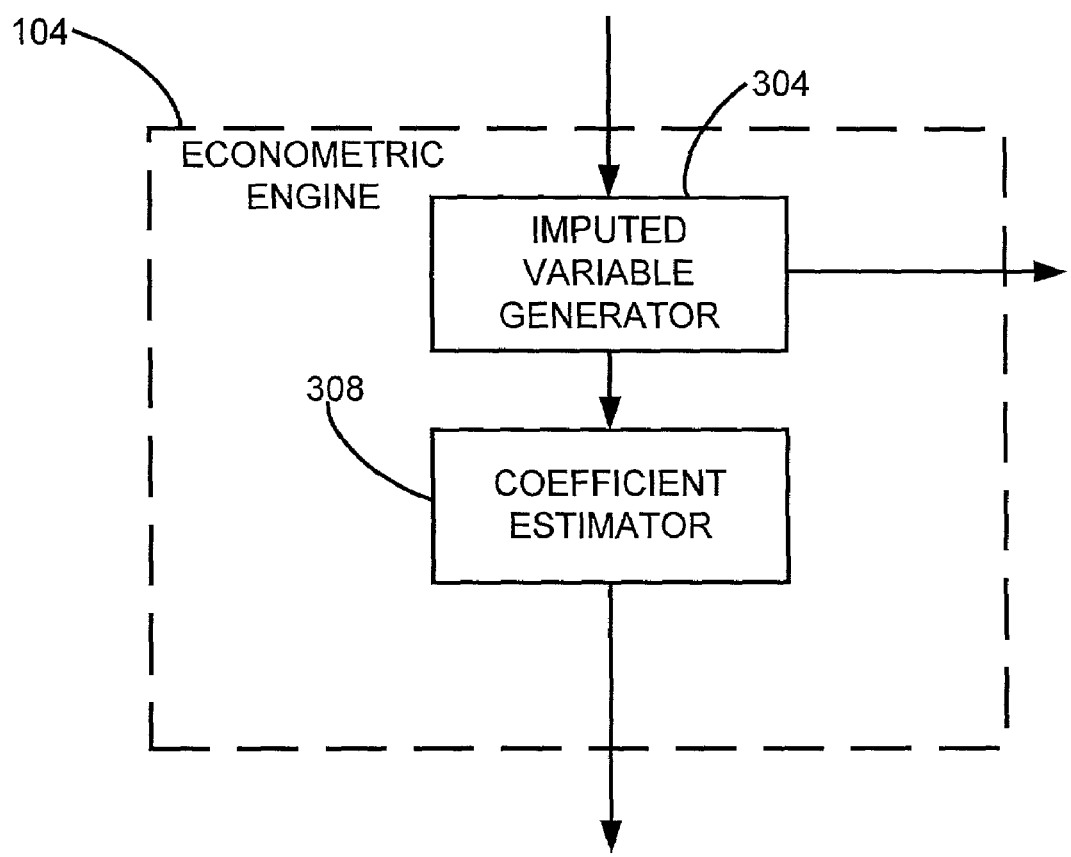
FIG. 3 is a more detailed schematic view of an econometric engine.

FIG. 3 is a more detailed view of the econometric engine 104. The econometric engine comprises an imputed variable generator 304 and a coefficient estimator 308. The data 120 from the stores 124 is provided to the imputed variable generator 304. The data 120 may be raw data generated from cash register data, which may be generated by scanners used at the cash registers. The raw data may be processed to create imputed variables. The imputed variables may be used to estimate parameters for a demand equation D(x), which may be used to estimate the amount of sales using variables such as price.

In a preferred embodiment of the invention, sales for a demand group (S) is calculated and a market share (F) for a particular product is calculated, so that demand (D) for a particular product is estimated by D=S·F. A demand group is defined as a collection of highly substitutable products. More preferably the creation of the demand model relies on a mixed-model framework, simultaneously utilizing information across all stores and products in a client category, where a category is defined as a collection of substitutable or complementary products. The mixed model methodology is also referred to as "Bayesian Shrinkage" Modeling, because by combining data from various stores and/or products, one can "shrink" individual parameter estimates towards the average estimate, dampening the extreme values that would result if traditional regression were used.

In developing product-level volume models for each store within a chain, one may be presented with a wide range of historical data in terms of modeling sufficiency. For some stores and/or products, the history will be quite rich, with many price changes and a variety of promotion patterns. For other stores and/or products, the history will be quite sparse, with very few price changes and little promotional activity. To maximize the stability of estimated model parameters, one might consider developing a single regression model across stores and/or products. This model might have stable parameter estimates; however, it would not fully leverage the store and/or product variability, and the resulting model would likely not predict well for a particular store and/or product. On the other hand, one might consider developing individual regression models for each store and/or product, to utilize the specific information contained in the data history. While these models might fit and predict well for the stores and/or products with substantial price variability, models would not be estimable for stores and/or products without a rich data history.

A mixed-model framework addresses the need for both highly predictive models and the existence of an estimable model for each store and product. In a mixed-effect model, information (in the form of data history) is leveraged across all stores and products, and a single cohesive model is built. Stores and products with little or no information in their data history default to an "average" (fixed-effect) model. Likewise, stores and products with a wealth of information in their data history will end up with unique parameter estimates tailored to their response pattern, via estimation of non-zero store and/or product-specific adjustment factors (random effects) which are added to the fixed-effect portion of the model.

Figure 5:
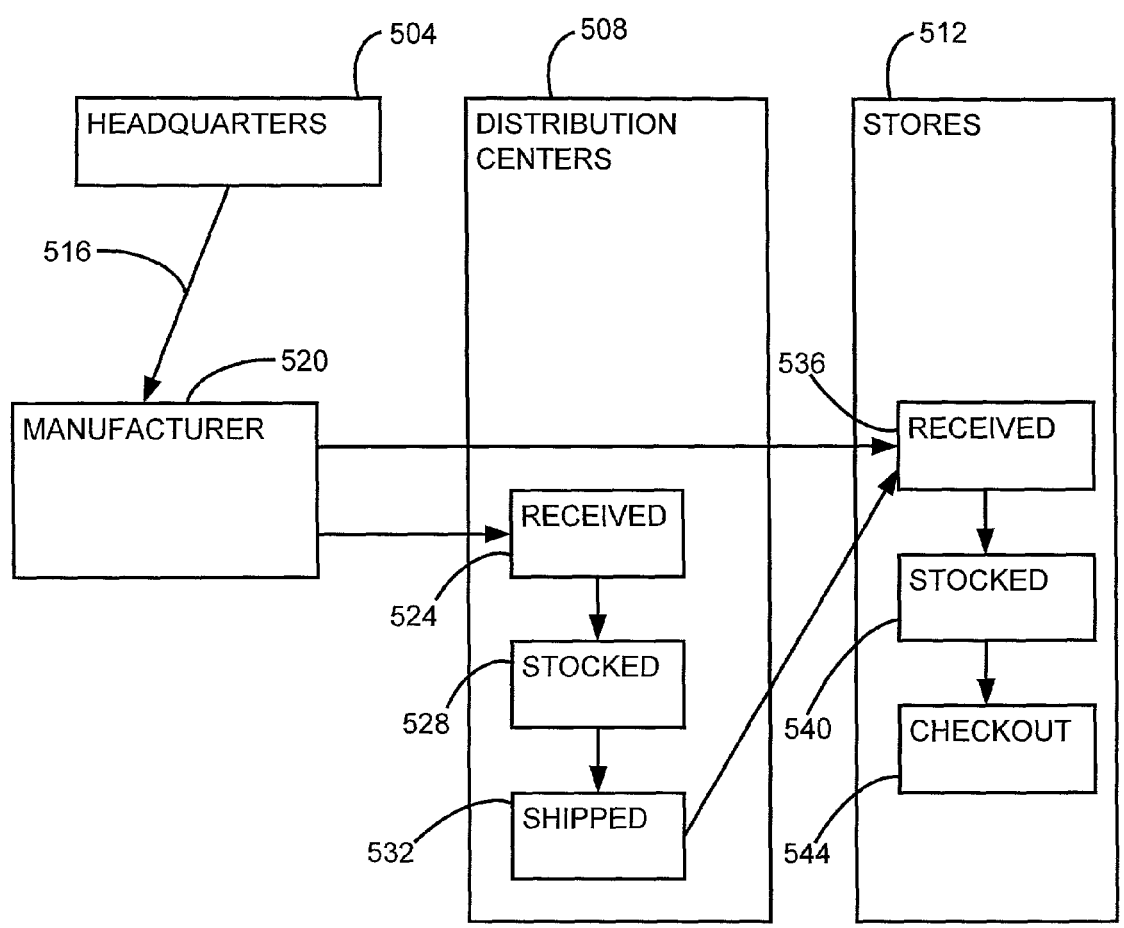
FIG. 5 is a block diagram to illustrate some of the transaction costs that occur in retail businesses of a chain of stores.

The financial model engine 108 receives data 132 from the stores 124 and may receive imputed variables and data from the econometric engine 104 to calculate fixed and variable costs for the sale of each item. To facilitate understanding, FIG. 5 is a block diagram to illustrate some of the transaction costs that occur in retail businesses of a chain of stores. The chain of stores may have a headquarters 504, distribution centers 508, and stores 512. The headquarters 504 may place an order 516 to a manufacturer 520 for goods supplied by the manufacturer 520, which generates an order placement cost. The manufacturer 520 may ship the goods to one of the distribution centers 508. The receiving of the goods by the distribution center 508 generates a receiving cost 524, a cost for stocking the goods 528, and a cost for shipping the goods 532 to one of the stores 512. The store 512 receives the goods from one of the distribution centers 508 or from the manufacturer 520, which generates a receiving cost 536 and a cost for stocking the goods 540. When a customer purchases the item, the stores 512 incur a check-out cost 544. With the large number of retail chains, different purchasing and delivery processes may be used. Even within a single chain, different manufacturers may provide different invoicing and delivery procedures and costing system, which may be different than the processes illustrated in FIG. 5.

The financial model engine 108 should be flexible enough to provide a cost model for these different procedures. These different costs may have variable cost components where the cost of an item is a function of the amount of sales of the item and fixed cost components where the cost of an item is not a function of the amount of sales of the item. The financial model engine 108 may use these fixed and variable costs to determine $C_{s,i,k,t}$, where $C_{s,i,k,t}$, is a cost for a particular product (k) given a store (s), demand group (i), and a day (t). The financial model engine 108 may use industry data to provide standard estimates. For example, instead of measuring how long it takes to stock a box of an item, an industry data may be used to estimate this time. The standard estimates helps to reduce the amount of data that must be collected. In a preferred embodiment of the invention, the stores may only need to supply labor costs of the stores and distribution centers, cost of capital, size of an item, and number of items in a case to allow a cost modeling. By using these estimations, costs may be more easily calculated on a store level, instead of being averaged over all of the stores. This is because if large amounts of data were measured by hand, measuring such data for each store would be difficult. The tailoring of costs per store allows the maximization of profits for each store.

Figure 4:
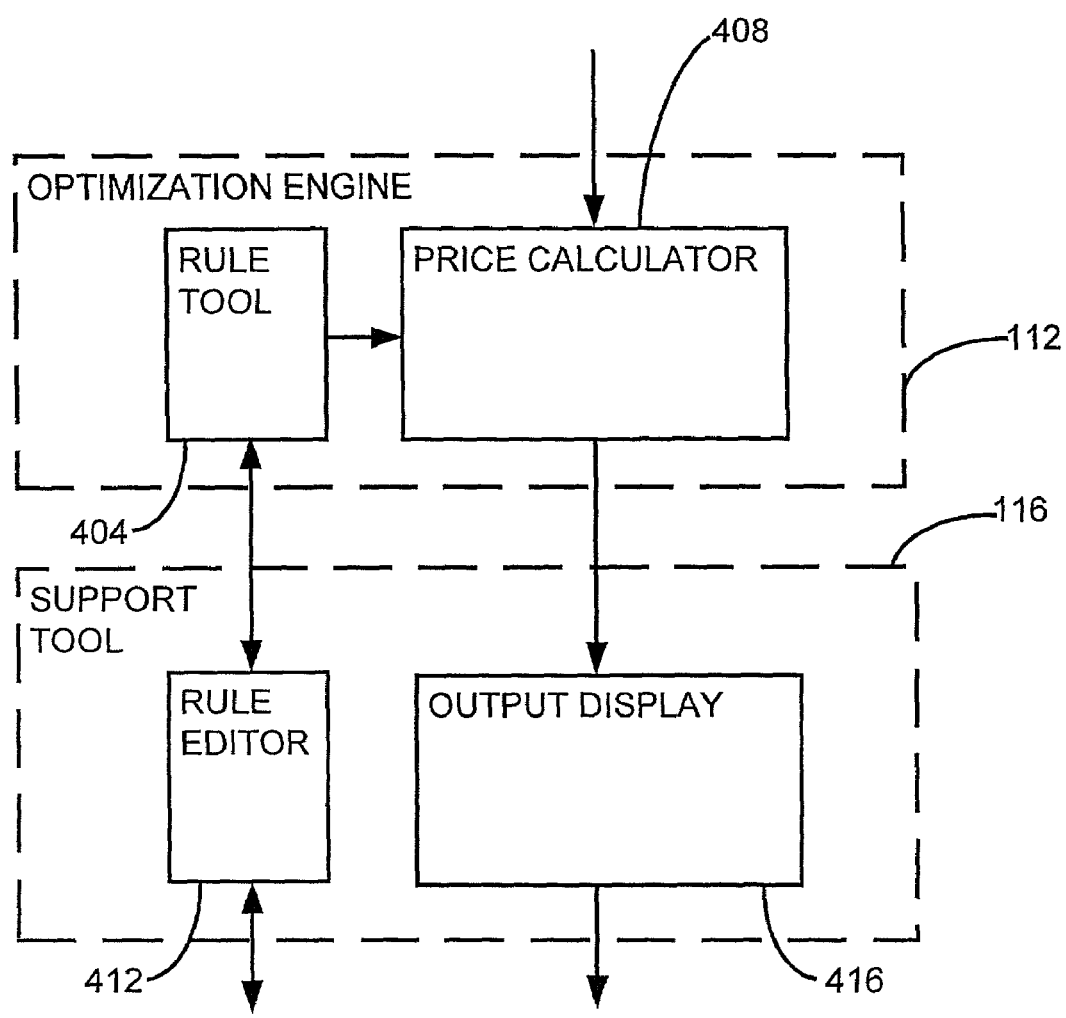
FIG. 4 is a more detailed schematic view of an optimization engine and support tool.

FIG. 4 is a more detailed schematic view of the optimization engine 112 and the support tool 116. The optimization engine 112 comprises a rule tool 404 and a price calculator 408. The support tool 116 comprises a rule editor 412 and an output display 416.

In operation, the client (stores 124) may access the rule editor 412 of the support tool 116 and provides client defined rule parameters (step 228). If a client does not set a parameter for a particular rule, a default value is used. Some of the rule parameters set by the client may be constraints to the overall weighted price advance or decline, branding price rules, size pricing rules, unit pricing rules, line pricing rules, and cluster pricing rules. These rules will be discussed in more detail regarding a preferred embodiment of the invention. The client defined parameters for these rules are provided to the rule tool 404 of the optimization engine 112 from the rule editor 412 of the support tool 116. Within the rule tool 404, there may be other rules, which are not client defined, such as a group sales equation rule. The rule parameters are outputted from the rule tool 404 to the price calculator 408. The demand coefficients 128 and cost data 136 are also inputted into the price calculator 408. The client may also provide to the price calculator 408 through the support tool 116 a desired optimization scenario rules. Some examples of scenarios may be to optimize prices to provide the optimum profit, set one promotional price and the optimization of all remaining prices to optimize profit, or optimized prices to provide a specified volume of sales for a designated product and to optimize price. The price calculator 408 then calculates optimized prices. The price calculator 408 outputs the optimized prices to the output display 416 of the support tool 116, which allows the stores 124 to receive the optimized pricing (step 232).

The system can optimize for profit, revenue, and sales. For each type of objective, users can impose constraints on the values of the other two. For instance a user can optimize profit while ensuring that total sales and revenue do not fall below their original values, or he/she can optimize sales while requiring profit to increase by 1%.

A preferred embodiment of the optimization engine uses the group sales equation S(x) and the market share equation F(x), previously described, to predict group sales and product market share, respectively. These two are then combined to predict product sales at the store level D(x)=S(x)·F(x).

If the objective is to maximize profit then the following equation sum is maximized:

$$\sum_{i \in G} \sum_{k \in Dem_i} \hat{D}_{s,i,k,t}(P_{s,i,k,t} - C_{s,i,k,t}) = \sum_{i \in G} \sum_{k \in Dem_i} \hat{F}_{s,i,k,t} \hat{S}_{s,i,t}(P_{s,i,k,t} - C_{s,i,k,t})$$

The above mentioned rules may be constraints forming boundaries. These constraints are rules that provide limitations to price or other changes. In referred embodiment such constraints may be used as follows:

1. Group Price Advance or Decline.

Since demand groups are made up of like or substitutable products, managers often wish to constrain the overall weighted price advance or decline in price for them, where the weights are the market shares of the products that constitute the demand groups. The constraints are:

$$\forall s, i, P \, MIN_{s,i} \leq \sum_k F_{s,i,k} P_{s,i,k} \leq P \, MAX_{s,i}$$

2. Brand Pricing Rules:

Products are described and categorized by attributes such as brand, size and flavor. Therefore, each product may be associated with a set of attributes and values. These attributes are useful to us for several reasons. The attributes may be used in the regression modeling in order to create a parsimonious set of regression coefficients. They may also be used in setting rules. For instance, category managers might wish to offer store brands at lower prices compared to the competing national brands. They might also wish to constrain some product brands to be less expensive than others, either for strategic considerations or to meet their contractual obligations. Specifically, a manager can create a set $Brand_{s,i} = \{(p_{s,i,l_1},p_{s,i,k_2}): p_{s,i,k_1} \text{ must cost less than } p_{s,i,k_2}\}$, which leads to the following constraints:

$\forall s,i$ and $(p_{s,i,k_1},p_{s,i,k_2}) \in Brand_{s,i}, p_{s,i,k_1} \leq p_{s,i,k_2}$ 3. Size Pricing Rules:

Managers might also wish to create rules that relate the price of one product versus another based on their sizes. For instance, they might wish for products belonging to the same brand and sharing other attributes, but with different sizes to be priced such that the larger sized product costs less per equivalent unit of measure than a smaller one. Then $cSize_{s,i} \equiv \{(p_{s,i,l_1},p_{s,i,k_2}): p_{s,i,k_1} \text{ must cost less than } p_{s,i,k_2}\}$, and create a set, which leads to the following constraints:

$\forall s,i$ and $(p_{s,i,k_1},p_{s,i,k_2}) \in cSize_{s,i}, p_{s,i,k_1} \leq p_{s,i,k_2}$ 4. Unit Pricing Rules:

Continuing in the same vein, managers might wish to ensure that two products that are identical in every respect but size should be priced such that the larger product costs more than the smaller one. This rule is closely related to the size pricing rule. To implement this rule, managers can create a set $Unit_{s,i} \equiv \{(p_{s,i,l_1},p_{s,i,k_2}): e_{s,i,k_1} p_{s,i,k_1} \text{ must cost less than } e_{s,i,k_2} p_{s,i,k_2}\}$, where $e_{s,i,k}$ is the multiplicative factor to convert equivalent units into whole product units. This leads to the following constraints:

$\forall s,i$ and $(p_{s,i,k_1},p_{s,i,k_2}) \in Unit_{s,i}, e_{s,i,k_1} p_{s,i,k_1} \leq e_{s,i,k_2} p_{s,i,k_2}$ 5. Line Pricing Rules:

Retail customers expect common prices for certain groups of products such as, for example, cough lozenges of the same brand but different flavors. These rules may be classified as line pricing rules and implement them as follows. Product groups called line price groups may be defined as $L_l$, $l=1, \ldots \|L\|$, where every product within a line group must have the same price in a store; i.e., $\forall L_l, l=1, \ldots \|L\|$, and $\forall k_1,k_2 \in L_l P_{s,i,k_1} = P_{s,i,k_2}$ 6. Cluster Pricing:

Retailers define geographic and other regions within which they maintain the same price for a given product. This may be translated to the notion of store clusters. A store cluster $Cluster_c$ is a set of stores such that the price of every product is invariant within the cluster. In other words, every product has the same price in every store within the cluster although each product may have a different price. In order to implement these constraints the set of stores may be partitioned into store clusters $Cluster_1, \ldots, Cluster_{\|C\|}$ where $C \equiv C\{Cluster_1, \ldots, Cluster_{\|C\|}\}$, and a new price variable $P_{c,i,k}$ which represents the common price for product k in cluster $Cluster_c$ may be defined. This variable may be used in place of the original price variable $P_{s,i,k}$ whenever $s \in Cluster_c$.

Other rules may also be used. An example of such additional rules may be, but is not limited to, a gross margin rule, a store volume rule, or a competition rule.

A gross margin rule provides a constraint on the change of a mark up. A gross margin rule may provide a constraint on the change of the mark up of each individual item in a group or on the average mark up of the group or both. An example of a gross margin rule may be that the percentage change of the average gross margin of a group is not to exceed 5%.

A volume rule provides a constraint on the change or the volume of sales. The volume rule may provide a constraint on the change of volume of sales for each individual store or on the change of total volume of sales for a plurality of stores for an individual product or for a plurality of products. An example of a volume rule may be that for each store, the change of demand for a product is not to exceed 7%.

A competition rule provides a constraint on the difference between a competing store's prices and their prices. A competition rule may allow constraints for one or more competitors. An example of a multiple competition rule is that the price of each item must not exceed the price for the same item sold by competitor store X by more than 10% of the price and must not exceed the price of the same item sold by competitor store Y by more than 9% of the price. To implement these constraints a store may use monitors to check prices of items in competitor store X and competitor store Y.

The objective (such as profit) is then maximized. Such an objective would provide a maximized profit given the demand data and the constraints.

Rule Relaxation

Given the objective and the plurality of constraints the solution may be infeasible due to a conflict between the objective and the plurality of constraints. The objective may be expressed as an equation. Each constraint may also be expressed as an equation. A feasible solution may not exist that satisfies all equations representing the objective and the constraints. A preferred embodiment of the invention uses a rule relaxation process to provide a feasible solution when a feasible solution does not exit which satisfies all constraints and objectives.

Figure 6:
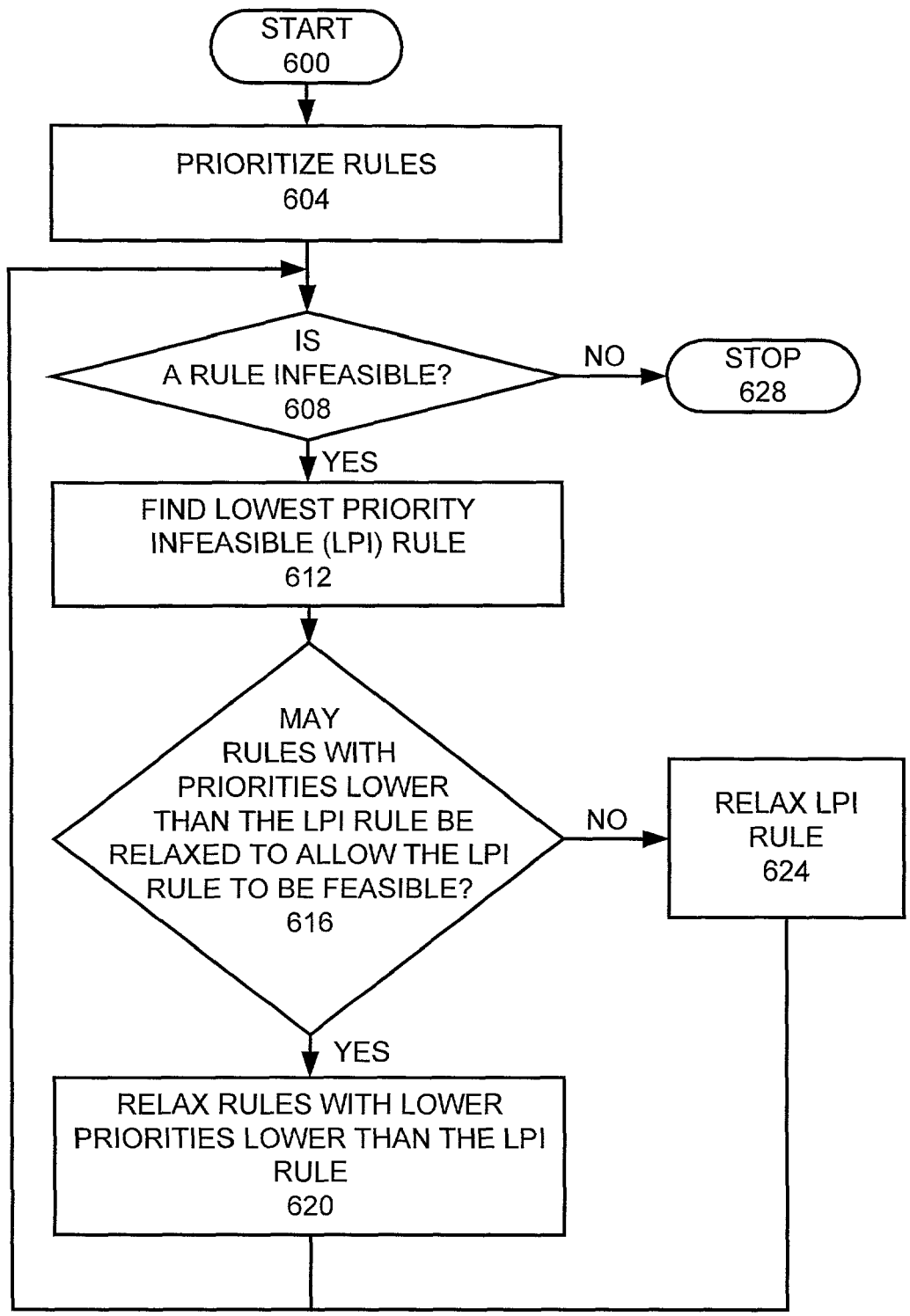
FIG. 6 is a flow chart of a preferred embodiment of a rule relaxation process.

During an optimization, it may be found that a rule is infeasible. A rule is determined to be infeasible, if either it cannot be satisfied when all other rules are satisfied or if an optimization cannot be performed without violating the rule. Although, one method of dealing with an infeasible rule is to drop the rule found to be infeasible, the preferred embodiment of the optimization step uses the rule relaxation process described below:

FIG. 6 is a flow chart of a preferred embodiment of the rule relaxation process. The steps of FIG. 6 start at step 600 as shown. The rules are prioritized (step 604). A default prioritization may be provided, with an interface, which may allow a user to change the prioritization from the default. A check is made to see if a rule is infeasible (step 608). A rule is deemed to be infeasible if the relationship expressed by the rule is not able to be satisfied. For instance a rule X+Y≦10, is violated for when X is 7 and Y is 7 since then X+Y=14 which is greater then 10. If no rule is found to be infeasible, the rule relaxation process is stopped (step 628). If at least one rule is found to be infeasible, the lowest priority infeasible (LPI) rule is found (step 612). A determination is made whether rules with lower priorities than the priority of the LPI rule may be relaxed to allow the LPI rule to become feasible (step 616). In the preferred embodiment the lower priority rules are checked before higher priority rules. If it is found that rules with lower priorities than that priority of the LPI rule may be relaxed to a point that allows the LPI rule to become feasible, then these rules with lower priorities are relaxed incrementally so that the LPI rule becomes feasible (step 620). In the preferred embodiment, lower priority rules are relaxed before higher priority rules. If it is found that rules with lower priorities than the priority of the LPI rule cannot be relaxed to allow the LPI rule to become feasible, then the LPI rule is relaxed until it becomes feasible (step 624). The rules are then rechecked to see if there are any remaining rules that are infeasible (step 608). This process is continued until all rules are feasible.

Example

To provide an example of rule relaxation, six categories of rules are provided. According to the method illustrated in the flow chart of FIG. 6, the categories of rules are prioritized (step 604) in the following order, with a ranking of 1 designating the category of rules with the highest priority and 6 designating the category of rules with the lowest priority.

1. Group price advance or decline rules. The user sets a maximum weighted group price advance or decline to 10%.

2. Size pricing rules. The user goes with the default that larger items cost less per equivalent unit than smaller identical items.

3. Brand pricing rules. For soft drinks, the user designates that the price of Brand A is never less than the price of Brand B. For juices the user designates that Brand C is always greater than Brand D.

4. Unit pricing rules. The user goes with the default that the overall price of larger items is greater than the overall price of smaller identical items.

5. Competition rules. The user designates that all prices must be at least 10% less than the prices of the same items sold by competitor X and are within 2% of the prices of the same items sold by competitor Y.

6. Line price rules. The user designates that different flavors of the same item are priced the same.

In this example, Brand A is sold by competitor Y for $8, while Brand B is sold by competitor Y for $10. In addition competitor Y sells one flavor of item C for $9 and another flavor of the same item C for $10.

A determination is made if a rule is infeasible (step 608). It is found that one of the price branding rules is infeasible, since Brand A is supposed to always have a price greater than the price of Brand B and yet competitor Y sells Brand A for $8 and Brand B for $10, and since the competition rules designate that the same items must be within 2% of the prices of competitor Y. In addition, it is found that one of the line price rules is infeasible. This is because the line price rule constrains different flavors of the same item to be the same, but competitor Y is selling one flavor for $9 and another flavor for $10.

Since the branding rules have a priority of 3 and the line price rules have a priority of 6, it is found the line price rules are the lowest priority infeasible (LPI) rules (step 612). A check is made to see if rules with a priority lower than 6 may be relaxed so that the line price rules become feasible (step 616). Since the line price rules are the lowest priority rules, no rule with a lower priority may be relaxed so that the line price rule becomes feasible. As a result, the line price rule is relaxed allowing the different flavors to have different prices by about 10% (step 624).

The process then returns to step 608 to see if any rules are still infeasible. It is found that one of the price branding rules is infeasible, since Brand A is supposed to always have a price greater than the price of Brand B and yet competitor Y sells Brand A for $8 and Brand B for $10, and since the competition rules designate that the same items must be within 2% of the prices of competitor Y. Since the price branding rules are the only rules found to be infeasible, they are found to be the lowest priority infeasible (LPI) rules with a priority of 3 (step 612). A check is made to see if rules with priorities lower than the LPI rules may be relaxed to allow the LPI to be feasible (step 616). Preferably, the lower priority rules are checked first. So first the line price rules with a priority of 6 are checked to see if they may be relaxed to allow the branding price rules to be feasible. If not, then the next lowest priority rules, the competition rules are checked to see if they may be relaxed to allow the branding rules to be feasible. In this example, it is found by relaxing a competition rule with a priority of 5 the price branding rule becomes feasible. Therefore the competition rule is relaxed so that prices are within about 20% of the prices of competitor Y, which allows Brand A and Brand B to have the same price (step 620).

The process again returns to step 608 to see if any rules are still infeasible. It is found that all rules are now feasible, and the rule relaxation process is stopped (step 628).

In the preferred implementations, the specific infeasible solution at which the optimization process stops will depend on the optimization algorithm and the initial starting point.

This means that specific rules that are relaxed in order to get to feasibility depend on both the optimization algorithm and the starting values These examples are merely illustrative and are not meant to limit the scope of the invention. In addition, rule priority was assigned by rule category. In other embodiments the rule priority may be assigned to individual rules instead of to rule categories.

Other specific methods of rule relaxation may be used. In general, rule relaxation methods provide for the prioritization of rules and cause lower priority rules to be relaxed before relaxing higher priority rules in order to make all resulting rules feasible. Another specific embodiment of this general rule relaxation method may allow different combinations of lower priority rules to be relaxed. These lower priority rules may be relaxed at the same rate or at different rates until the higher priority rule becomes feasible. Different combinations of the relaxation of lower priority rules may be specified in different embodiments.

Once the optimization (step 701) is completed, the prices of the products are sent to the stores. The prices of the products are then set to the optimized prices that are provided by the optimization.

Subset Optimization

After an optimization, such as the optimization described above has been performed, new data may then be provided to the system (step 703). Such data may be provided through the Econometric Engine 104 (FIG. 1) or the Financial Model Engine 108, or through another source. If the entire product category was optimized using the new data, it is possible that all items in the product category would change because of the new data. To avoid an optimization that may cause a repricing of all products in the product category (since the cost of repricing is not negligible), the user is allowed to specify subset limits (step 705). An example of such subset limits would be a maximum number N of products that may be repriced. A new optimization is performed using the new data, where the optimization is constrained to comply with the subset limits (step 707). For example, if a maximum number N of products may be repriced, the optimization provides an optimization with price changes of no greater than N products. Since the price of no more than N products is changed, instead of possibly the price of all products of the category, only a subset of the product category is optimized. The subset optimization may use the results of the previous optimization as initial values.

The subset optimization may choose the products that comprise this subset in a way that has the largest impact on the client's objective function. If, for example, the client's objective is to maximize profit, it is desirable to populate the subset of products whose prices are allowed to change with those products that are most likely to have the largest impact on profit. In one way of doing this, all of the available products may be ranked by their marginal contribution to the objective and then the subset of products whose prices are allowed to change is selected via mixed integer program. The prices of all of the products not in the "optimal" subset may be frozen to provide a variant of the original scenario to obtain a new set of optimized prices.

A restatement of the process in FIG. 7, is as follows: The optimization of a product category may performed as discussed in the previous sections (step 701) to provide optimal prices, demand functions and constraints for all of the products considered in the product category. All of the input data used in the initial optimization of the product category and $\bar{p}^*_{Cluster_c}$, the set of optimal prices derived from that data, may be used to provide initial conditions and parameters for the subset optimization.

Changes to the state of information that the user wishes to incorporate into the new optimization are also provided (step 703). For changes in costs, base price, or competitive prices, the change in the data from the original scenario measured as a percentage of base price is used. For discontinued or new products, the input data required to construct their demand functions and constraints as they would have been defined in the original optimization, as well as an initial starting base price, are used.

The subset limits, such as the maximum number of products that the user wishes to allow in the subset optimization, are specified (step 705). One possible assumption for an algorithm may be that the maximum number is at least as large as the number of products with information changes. A new optimization is then performed within the subset limits (step 707).

Figure 8:
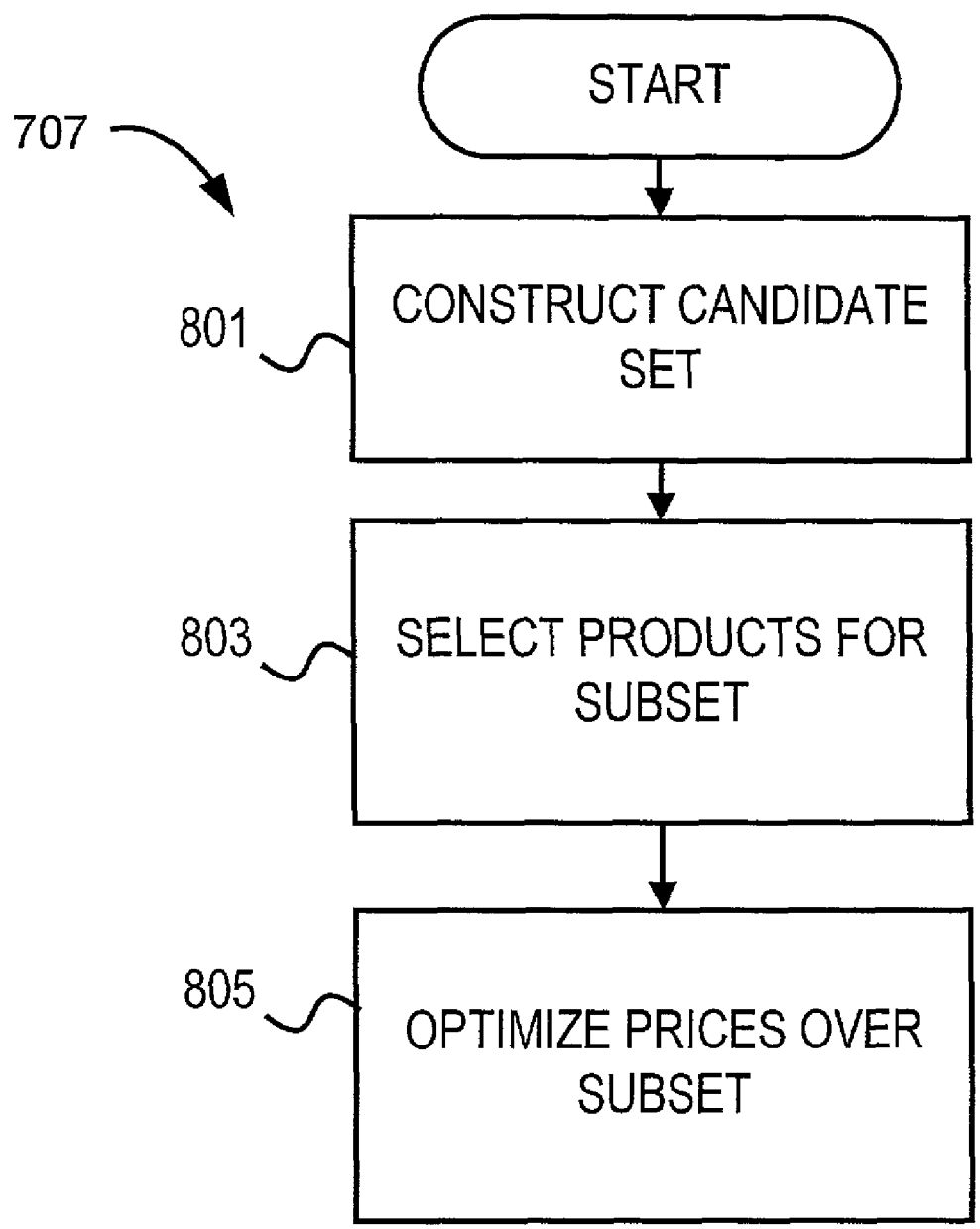
FIG. 8 is a more detailed flow chart of an embodiment of a step of optimizing product category within subset limits.

FIG. 8 is a more detailed flow chart of an embodiment of the step of optimizing product category within subset limits (step 707). A first step constructs a set of products that will be considered as candidates for the subset to be optimized (step 801). A second step chooses which of the candidates will be members of the subset (step 803), for example, by solving a mixed integer problem. A third step finds the new optimal prices for the products in the subset while holding the prices of the other goods at their prior optimal level (step 805).

Construction of the Set of Candidates for Subset Optimization

The purpose of this step is to define a set of products, C, which will be candidates for subset optimization (step 805). In defining this set, priority is given to two distinct types of products: those products that have had changes in their state of information, and those products that have constraints that would allow their price to move if they are selected to be members of C.

Products with changes in state information are automatically included in C and in the subset of products to be optimized. The second group of products is chosen based on characteristics of their constraints and the direction of the gradient of the price variables with respect to the objective function at the incumbent optimal price. It is desirable to only choose products whose prices will actually be able to move in the subset optimization. If a product's price is at a bound in the original scenario and the gradient of the price variable indicates that the price will continue in the direction of the bound if the bound is relaxed, then the price will not move in the subset optimization since it will still hit that bound. If, however, the product's price was initially not at a bound or if it is at a bound but the gradient indicates that the price would move away from the bound if it were relaxed, then it would be expected that this price would change, if it is included in the subset optimization. In order to discover the direction of the gradient of prices at their previous optimal price, a simple model is formulated that evaluates the original objective function while allowing prices to vary slightly from their previous optimal level, $\bar{p}^*_{Cluster_c}$. This model consists of the fundamental model equations that define demand group sales, market share, the user-defined objective function, and simple bounds holding prices within a small neighborhood of their previous optimal values. For a profit-maximizing problem, the model might be formulated as:

$$\text{Max} \sum_{i \in G} \sum_{k \in Dem_i} \hat{D}_{s,i,k,t}(P_{s,i,k,t} - C_{s,i,k,t})$$

$$\bar{p}^*_{Cluster_c} - \delta \leq P_{s,i,k} \leq \bar{p}^*_{Cluster_c} + \delta, \quad \forall\, s, i, k$$

where $\delta$ is a small number.

$\lambda_k^u$ and $\lambda_k^l$ are defined as the marginal values on the upper and lower bounds defined in the final inequality constraints. These marginal values will be used as a measure of the price gradient as the price moves away from the incumbent optimal price. They, in concert with information about which bounds were active in the original problem, will determine which products are allowed to have price changes in the subset optimization.

Products for the second group should have the freedom to change prices during the subset optimization. To this end, all of the constraints in the initial model are evaluated and three operations are performed. First, a check is performed to see if that constraint was tight for the optimal price in the original scenario. Essentially, this just means that those store-product combinations where the right and left-hand sides of the constraint equations are the same are found. For example, suppose that there is an upper bound on optimal price:

$$P_{c,i,k} \leq PMAX_{c,i,k}, \forall i,k$$

where c is the store cluster, i is the demand group, and k is the product. For this rule, all of the store-product combinations where $$P_{c,i,k} = PMAX_{c,i,k}, \forall i,k$$

would be found.

Rule relaxation, discussed above, may have been utilized in the original optimization. As discussed above, rule relaxation allows the optimization to automatically relax constraints subject to a hierarchy defined by the user. Since the subset optimization is based on the original constraints of the initial scenario, it is possible to have optimal prices from the initial scenario that are infeasible with respect to some of the original constraints because those constraints were relaxed in the first scenario optimization. The second operation relaxes the bound on any store-product combinations for which the incoming optimal price is infeasible. Thus, for an upper price bound, we would set $PMAX_{c,i,k}$ equal to $P_{c,i,k}$.

The third procedure changes the initial bounds on those products which have had cost, base price or competitive price changes. If the cost, base price, or competitive price has increased, it is desirable to increase the upper bound constraints so that the optimal price is allowed to move. The upper price bound, for example, would become $$P_{c,i,k} \leq PMAX_{c,i,k}(1+\xi_{c,k}), \forall i,k$$

where $\xi_{c,k}$ is percentage change in cost or price with respect to base price. If the cost has increased, it is also desirable to raise the lower bound to prevent the price from flipping from the upper to the lower bound. The corresponding lower price bound would be $$P_{c,i,k} \geq \text{Max}(PMAX_{c,i,k}(1-\bar{\lambda}_{c,k}), \bar{p}^*_{Cluster_c}) \forall i,k$$

where $\bar{\lambda}_{c,k}$ is a scaling factor for the allowable price region and $\bar{p}^*_{Cluster_c}$ is the optimal price for that product from the original scenario. If the cost or price has declined, then the lower price bound would become $$P_{c,i,k} \geq PMIN_{c,i,k}(1-\xi_{c,k}), \forall i,k$$

and the upper bound becomes $$P_{c,i,k} \geq \text{Min}(PMIN_{c,i,k}(1+\bar{\lambda}_{c,k}), \bar{p}^*_{Cluster_c}) \forall i,k$$

For constraints on the average price of a demand group, the bound is changed by the market share weighted average change in the cost or price relative to initial base price.

The set of candidates for subset optimization, C, may now be constructed as follows:

For each store, product and constraint:
1. Initialize C to include all available products.
2. If $\lambda_k^l > 0$ or $\lambda_k^u < 0$, then $k \notin C$
3. If constraint is an active upper bound on price and $\lambda_k^u > 0$, then $k \notin C$
4. If constraint is an active lower bound on price and $\lambda_k^l < 0$, then $k \notin C$
5. If product has change in the state of information, then $k \in C$ Selection of the Set of Products for Subset Optimization In selecting the N products that will comprise the set of products, R, which are allowed to have price changes in the subset optimization, a simple mixed integer problem is solved. A binary variable, $r_k$, is created that indicates whether or not a given product is chosen to become a member of R. An objective function is the sum of these binary variables weighted by the maximum marginal value on each product's price obtained in the step of constructing the set of candidates for subset optimization. The only constraint is that the number of products chosen must be less than n, the user-defined maximum number of products allowed in the subset optimization minus the number of products with changes in the state of information. This problem can be written as $$\text{Max}_r \left[ \sum_{k \in C} r_k \cdot \text{Max}(|\lambda_k^l|, |\lambda_k^u|) \right]$$

subject to $$\sum_{k \in C} r_k \leq n.$$

The set of products, R, may be defined to be considered in subset optimization as $k \in R: \{(k \notin C | r_k = 1) \cup (k \in C | k \text{ has change in state})\}$.

Optimize Prices Over the Product Subset R

The price variables of products that are not members of R are fixed and this new problem is solved with a complete optimization, such as the initial optimization described above, except that prices not in the subset are held fixed. Regression models and the predictive equations from the econometrics models are used to construct the optimization model. For example, the objective may be to maximize profit:

$$\sum_{i \in G} \sum_{k \in Dem_i} \hat{D}_{s,i,k,t}(P_{s,i,k,t} - C_{s,i,k,t})$$

subject to constraining price changes to be within a given range of current prices.

$$PMIN_{s,i,k,t} \leq P_{s,i,k,t} \leq PMAX_{s,i,k,t}$$

To simplify notation, the time index may be removed from the equations. So the objective becomes:

Maximize:

$$\sum_{i \in G} \sum_{k \in Dem_i} \hat{D}_{s,i,k}(P_{s,i,k} - C_{s,i,k}).$$

When the subset optimization is completed and prices are optimized over the subset (step 805) a unique subset optimized data package is provided. The data package of the new prices for the subset of products is provided to the stores. The prices for the products in the subset, which is a smaller set than all of the products, are changed (set) according to the optimized subset prices.

The subset optimization may be repeated several times between a complete optimization allowing all prices to change. For example, after subset optimization, new data may be provided. A user may specify new subset limits or use the previous subset limits. A new subset optimization may then be performed, using the specified subset limits and holding any frozen prices to the prices provided by the previous subset optimization.

In addition to the constraints listed above, the preferred embodiment may model several other business rules via constraints. These include limits on group price advance or decline, brand pricing rules, size pricing rules, and line pricing rules, as discussed above.

Figure 9A:
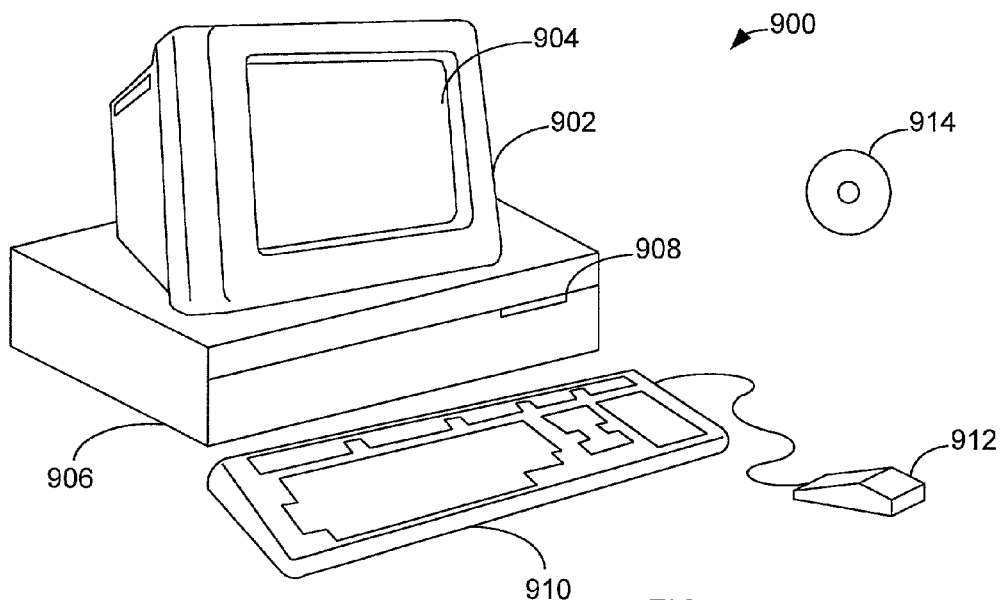
FIGS. 9A and 9B illustrate a computer system, which forms part of a network and is suitable for implementing embodiments of the present invention.
Figure 9B:
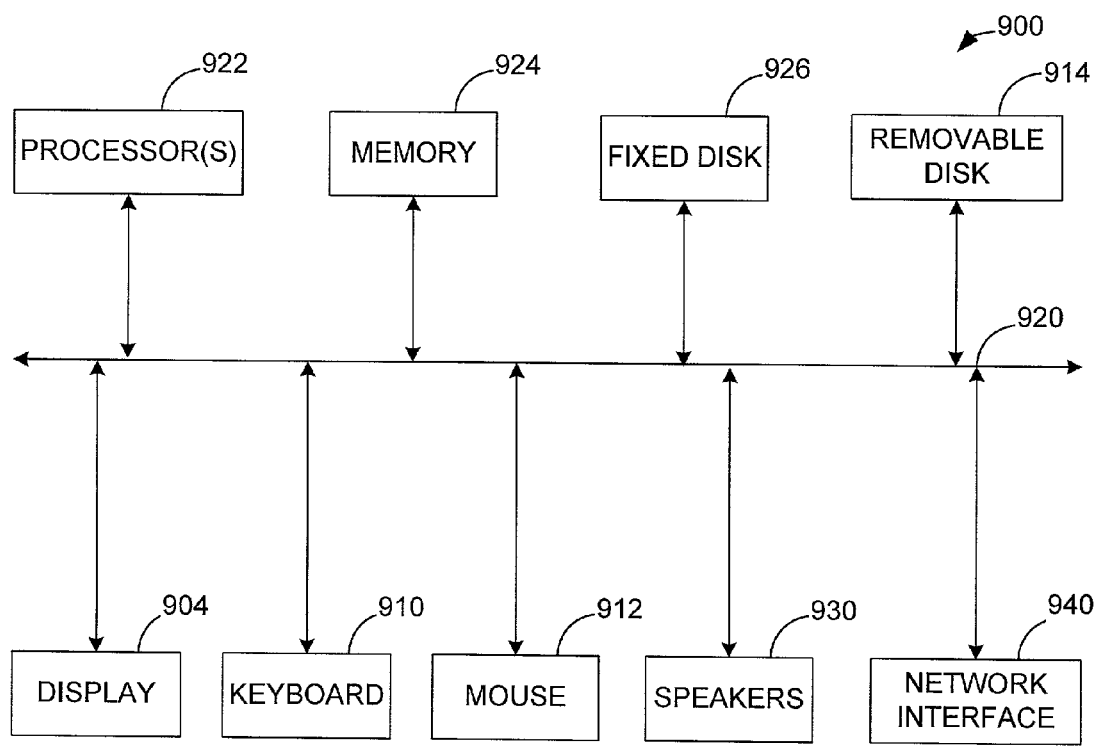

FIGS. 9A and 9B illustrate a computer system 900, which is suitable for implementing embodiments of the present invention. FIG. 9A shows one possible physical form of the computer system. Of course, the computer system may have many physical forms ranging from an integrated circuit, a printed circuit board, and a small handheld device up to a huge super computer. Computer system 900 includes a monitor 902, a display 904, a housing 906, a disk drive 908, a keyboard 910, and a mouse 912. Disk 914 is a computer-readable medium used to transfer data to and from computer system 900.

FIG. 9B is an example of a block diagram for computer system 900. Attached to system bus 920 are a wide variety of subsystems. Processor(s) 922 (also referred to as central processing units, or CPUs) are coupled to storage devices, including memory 924. Memory 924 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A fixed disk 926 is also coupled bi-directionally to CPU 922; it provides additional data storage capacity and may also include any of the computer-readable media described below. Fixed disk 926 may be used to store programs, data, and the like and is typically a secondary storage medium (such as a hard disk) that is slower than primary storage. It will be appreciated that the information retained within fixed disk 926 may, in appropriate cases, be incorporated in standard fashion as virtual memory in memory 924. Removable disk 914 may take the form of any of the computer-readable media described below.

CPU 922 is also coupled to a variety of input/output devices, such as display 904, keyboard 910, mouse 912 and speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 922 optionally may be coupled to another computer or telecommunications network using network interface 940. With such a network interface, it is contemplated that the CPU might receive information from the network, or might output information to the network in the course of performing the above-described method steps. Furthermore, method embodiments of the present invention may execute solely upon CPU 922 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher level code that are executed by a computer using an interpreter. Computer readable media may also be computer code transmitted by a computer data signal embodied in a carrier wave and representing a sequence of instructions that are executable by a processor.

Figure 10:
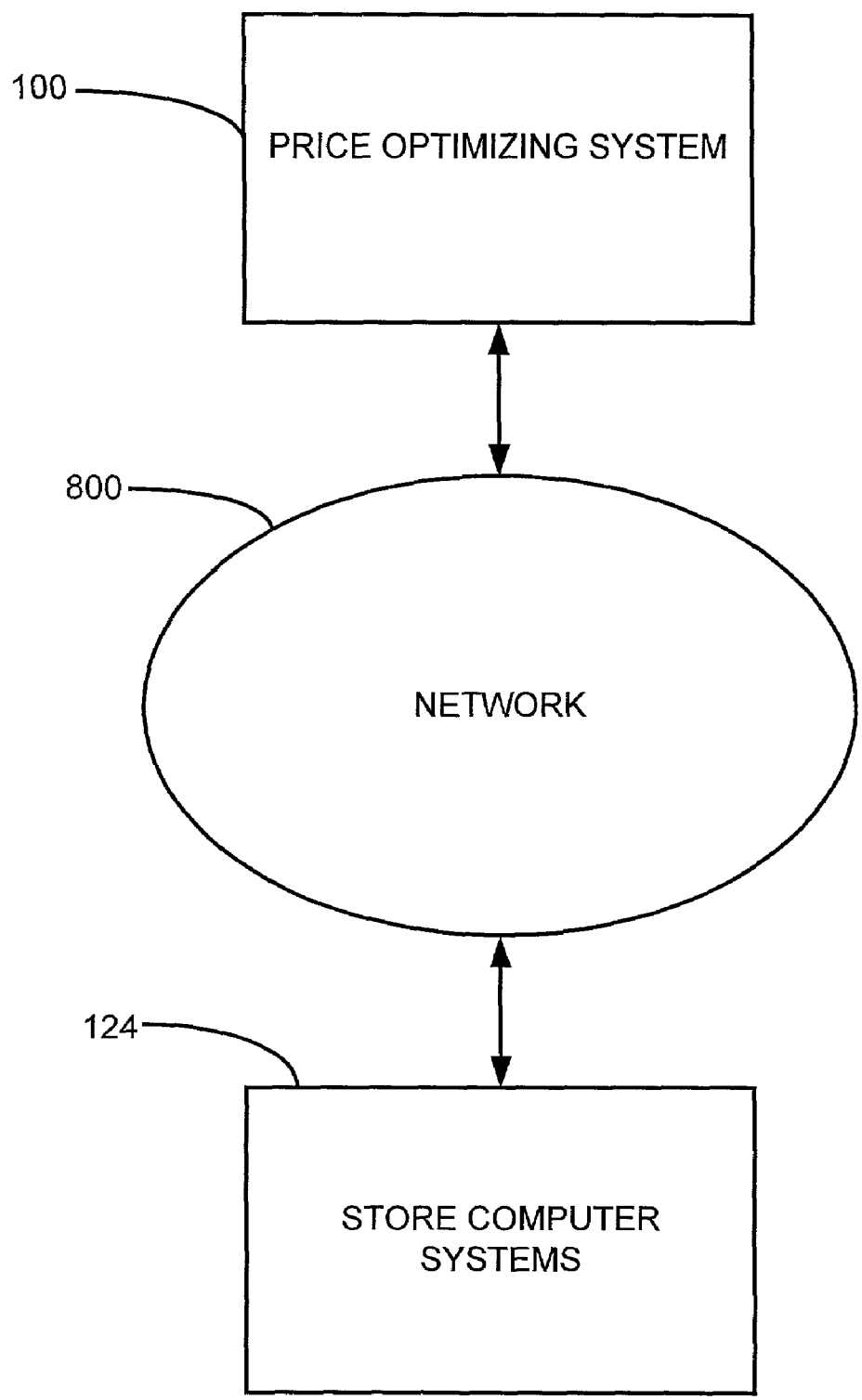
FIG. 10 is a schematic illustration of an embodiment of the invention that functions over a network.

FIG. 10 is a schematic illustration of an embodiment of the invention that functions over a computer network 800. The network 800 may be a local area network (LAN) or a wide area network (WAN). An example of a LAN is a private network used by a mid-sized company with a building complex. Publicly accessible WANs include the Internet, cellular telephone network, satellite systems and plain-old-telephone systems (POTS). Examples of private WANs include those used by multi-national corporations for their internal information system needs. The network 800 may also be a combination of private and/or public LANs and/or WANs. In such an tai embodiment the price optimizing system 100 is connected to the network 800. Computer systems used by the stores 124 are also connected to the network 800. The computer systems for the stores 124 are able to bi-directionally communicate with the price optimizing system 100 over the network 800.

While this invention has been described in terms of several preferred embodiments, there are alterations, modifications, permutations, and substitute equivalents, which fall within the scope of this invention. It should also be noted that there are many alternative ways of implementing the methods and apparatuses of the present invention. It is therefore intended that the following appended claims be interpreted as including all such alterations, modifications, permutations, and substitute equivalents as fall within the true spirit and scope of the present invention.

What is claimed is:

1. In a computer system, a method for computing a preferred set of prices for a subset of products of a plurality of products, comprising:

setting, using the computer system, a plurality of relaxable rules, wherein the setting of rules utilizes rule parameters, and wherein the rule parameters include default rule parameters and configured rule parameters;

prioritizing, using the computer system, the plurality of relaxable rules;

identifying, using the computer system, at least one lower priority infeasible rule from the plurality of relaxable rules;

incrementally relaxing, using the computer system, any infeasible rule of the plurality of rules which has a lower priority than the at least one lower priority infeasible rule to allow the at least one lower priority infeasible rule of the plurality of rules to become feasible;

storing, using the computer system, initial prices for a plurality of products;

designating, using the computer system, a subset of products of the plurality of products, wherein the number of products in the subset of products is less than the number of products in the plurality of products; and optimizing, using the computer system, prices for products in the subset of products, while maintaining the initial prices of products of the plurality of products that are not in the subset of products, and wherein the optimizing of prices complies with the relaxed any infeasible rule of the plurality of rules.

2. The method, as recited in claim 1, wherein the designating a subset comprises:

allowing a number N to be designated; and selecting no more than N products of the plurality of products to form the subset of products, wherein the selecting no more than N products has the largest impact on the optimizing of prices of any subset of no more than N products of the plurality of products, and further wherein the largest impact on the optimization is determined by ranking all products by a marginal contribution to the optimization and selecting the no more than N products by a mixed integer problem.

3. The method, as recited in claim 2, further comprising providing, using the computer system, an optimization of at least one of total profit, sales volume, and revenue for the subset of products.

4. The method, as recited in claim 1, further comprising providing, using the computer system, initial prices by optimizing prices for all of the plurality of products.

5. The method, as recited in claim 4, further comprising providing, using the computer system, new data subsequent to providing initial prices by optimizing prices.

6. The method, as recited in claim 5, wherein the new data comprises new price data and new price bound data, and wherein new price bound data includes changes in costs, base price, competitive prices, point-of-sale data, product information and store information.

7. The method, as recited in claim 2, further comprising providing, using the computer system, an optimization of total revenue for the subset of products.

8. The method, as recited in claim 2, further comprising providing, using the computer system, an optimization of sales volume for at least one product of the subset of products.

9. The method, as recited in claim 1, wherein the rule parameters includes at least one of group price change, brand pricing rules, size pricing rules, unit pricing rules, line pricing rules, cluster pricing rules, gross margin rule, store volume rule and competition rules.

10. A computer implemented, price optimization system for optimizing a preferred set of process for a subset of a plurality of products, comprising:

a rule editor configured to set a plurality of relaxable rules, wherein the plurality of relaxable rules is set utilizing rule parameters, wherein the rule editor utilized default values of the rule parameters, and further wherein the rule editor enables configuring of the rule parameters by a user;

a rule prioritizer configured to receive a prioritization of the plurality of relaxable rules, and for identifying at least one lower priority infeasible rule from the plurality of relaxable rules;

a rule relaxation module configured to incrementally relax any infeasible rule of the plurality of relaxable rules which has a lower priority than the at least one lower priority infeasible rule, enabling the at least one lower priority infeasible rule to become feasible;

a database configured to store initial prices for a plurality of products;

a product designator configured to designate a subset of products of the plurality of products, wherein the number of products in the subset of products is less than the number of products in the plurality of products; and an optimization engine configured to optimize prices for products in the subset of products, while maintaining the initial prices of all other products of the plurality of products and wherein the optimizing of prices complies with the relaxed any infeasible rule of the plurality of rules.

11. The price optimization system, as recited in claim 10, wherein the product designator for designating a subset enables a number N to be designated, and wherein the product designator selects no more than N products of the plurality of products to form the subset of products, and wherein the selected no more than N products has the largest impact on the optimization of prices of any subset of no more than N products of the plurality of products, and further wherein the largest impact on the optimization is determined by ranking all products by a marginal contribution to the optimization and selecting the no more than N products by a mixed integer problem.

12. The price optimization system, as recited in claim 11, wherein the optimization engine provides an optimization of at least one of total profit, sales volume, and revenue for the subset of products.

13. The price optimization system, as recited in claim 12, wherein the optimization engine provides initial prices by optimizing prices for all of the plurality of products.

14. The price optimization system, as recited in claim 10, wherein the optimization engine provides initial prices by optimizing prices for all of the plurality of products.

15. The price optimization system, as recited in claim 10, wherein the optimization engine provides an optimization of total revenue for the subset of products.

16. The price optimization system, as recited in claim 10, wherein the optimization engine provides an optimization of sales volume for at least one product of the subset of products.

17. The price optimization system, as recited in claim 10, wherein the rule editor enables configuration of at least one of group price change, brand pricing rules, size pricing rules, unit pricing rules, line pricing rules, cluster pricing rules, gross margin rule, store volume rule and competition rules.

* * * * *